United States Patent [19]

Kuroda et al.

[11] Patent Number: 4,518,752
[45] Date of Patent: May 21, 1985

[54] PROCESS FOR POLYOLEFINS PRODUCTION

[75] Inventors: Nobuyuki Kuroda, Yokohama; Toru Nakamura, Kawasaki; Yutaka Shikatani, Yokohama; Kazuo Matsuura, Tokyo, all of Japan

[73] Assignee: Nippon Oil Co., Ltd., Tokyo, Japan

[21] Appl. No.: 551,516

[22] Filed: Nov. 15, 1983

Related U.S. Application Data

[63] Continuation of Ser. No. 329,028, Dec. 9, 1981, abandoned.

[30] Foreign Application Priority Data

May 7, 1981 [JP] Japan ................................ 56-68685

[51] Int. Cl.$^3$ .......................... C08F 4/02; C08F 10/00
[52] U.S. Cl. .................................... 526/116; 502/121; 502/125; 502/131; 502/133; 502/134; 502/129; 526/114; 526/115; 526/121; 526/122; 526/124; 526/125; 526/348.6; 526/352; 526/901; 526/906
[58] Field of Search ............... 526/121, 122, 125, 124, 526/116

[56] References Cited

U.S. PATENT DOCUMENTS

| 3,991,260 | 11/1976 | Matsuura et al. | 526/125 |
| 4,202,953 | 5/1980 | Matsuura et al. | 526/125 |
| 4,209,601 | 6/1980 | Kuroda et al. | 526/125 |
| 4,209,602 | 6/1980 | Kuroda et al. | 526/125 |
| 4,315,999 | 2/1982 | Matsuura et al. | 526/125 |

FOREIGN PATENT DOCUMENTS

| 2600593 | 7/1976 | Fed. Rep. of Germany | 526/125 |
| 50-28479 | 9/1975 | Japan | 526/125 |
| 2040967 | 9/1980 | United Kingdom | 526/125 |

Primary Examiner—Edward J. Smith
Attorney, Agent, or Firm—Robert E. Burns; Emmanuel J. Lobato; Bruce L. Adams

[57] ABSTRACT

A process for the homopolymerization or copolymerization of olefins is disclosed, which is carried out in the presence of an improved catalyst comprising a solid catalyst component and an organometal compound, said solid catalyst component being obtained by the reaction of: (a) a magnesium halide, (b) a compound represented by the formula: $Me(OR)_nX_{z-n}$ where Me is any of the Group I—VIII elements of the Periodic Table, excluding Al, Si, Ti and V, R is a hydrocarbon residual group having 1-24 carbon atoms, X is a halogen atom, z represents the valence of Me and n is $0 < n \leq z$, and (c) a compound represented by the formula: $Si(OR')_mX_{4-m}$ where R' is a hydrocarbon residual group having 1-20 carbon atoms, X is a halogen atom, and m is $0 \leq m \leq 4$, and (d) a titanium compound and/or a vanadium compound. The resulting polymers are characterized by a large bulk density, a narrow range of molecular weight distribution, and small amounts of hexane extraction.

10 Claims, No Drawings

PROCESS FOR POLYOLEFINS PRODUCTION

This is a continuation, of application Ser. No. 329,028, filed Dec. 9, 1981 now abandoned.

BACKGROUND OF THE INVENTION

1. Field of the Invention

This invention relates to a process for the production of polyolefins employing novel catalysts.

2. Prior Art

Catalysts for the production of polyolefins have been known which include a transition metal compound such as a titanium compound and a vanadium compound carried on a magnesium halide, and an organometallic compound as disclosed, for example, in Japanese Patent Publication No. 39-12105. Another similar catalyst is described in Belgian Pat. No. 742,112 and includes titanium tetrachloride carried on a magnesium halide anhydride which has been activated by a ball mill. Either of such prior art has still much to be desired in respect of the catalytic activity.

German Pat. No. 2137872 is directed to the copulverization of magnesium halide, titanium tetrachloride and alumina whereby the consumption of magnesium halide is minimized. This process however has not achieved any substantial increase in the per solid polymerization activity.

It is known that the bulk density of a given polymer is also an important factor having regard to the yields as well as to the slurry handling.

SUMMARY OF THE INVENTION

The present invention provides a process for the homopolymerization or copolymerization of olefins using an improved catalyst which will achieve higher polymerization activity and greater bulk density of the resulting polymer as compared to the prior art teachings. The invention is further directed to the preparation of such improved catalysts which permits using reduced monomer partial pressures with minimum catalyst residues in the resulting polymer, whereby the step of removing the catalyst residue in the polymer can be dispensed with and the polymer handling procedures simplified, contributing to an economical polyolefins production.

Another advantage of the process of the invention is that the bulk density of the polymer being greater, there is obtained greater yield of polymer per unit solvent.

A further advantage of the invention resides in that despite the increased bulk density, the resulting polymer contains a relatively small proportion of objectionably coarse particles and minute particles of less than 50 microns. This makes it feasible to carry out the polymerization reaction in a continuous fashion and also facilitates centrifugal separation of polymer particles as well as the transport or otherwise handling of the polymer.

A still further advantage of the invention is that a polyolefin such as for example polyethylene which may be obtained according to the inventive process has a large bulk density such that less hydrogen concentrations are required to obtain an intended melt index and hence the total polymerization pressures can be held to a minimum.

Still another advantage of the invention is that the rate of diminision with time of ethylene for example being absorbed by the catalyst is considerably reduced so that a relatively prolonged polymerization reaction can be achieved with a relatively small amount of catalyst.

Another, yet important advantage of the invention is that the polymer has a very narrow range of molecular weight distribution such that low molecular weight components extracted by hexane may be minimized, making it possible to apply the polymer most suitably for example to a grade of films highly resistant to blocking.

Briefly stated, the foregoing advantages of the invention accrue from the provision of an improved catalyst comprising a solid catalyst component and an organometal compound, said solid catalyst component being obtained by the reaction of: (a) a magnesium halide, (b) a compound represented by the formula: $Me(OR)_nX_{z-n}$ where Me is any of the Group I-VIII elements of the Periodic Table, excluding Al, Si, Ti and V, R is a hydrocarbon residual group having 1–24 carbon atoms, X is a halogen atom, z represents the valence of Me and n is $0 < n \leq z$, and (c) a compound represented by the formula: $Si(OR')_mX_{4-m}$ where R' is a hydrocarbon residual group having 1–20 carbon atoms, X is a halogen atom, and m is $0 \leq m \leq 4$, and (d) a titanium compound and/or a vanadium compound.

DESCRIPTION OF THE PREFERRED EMBODIMENTS

The magnesium halide which is substantially anhydrous in the practice of the invention includes magnesium fluoride, magnesium chloride, magnesium bromide and magnesium iodide of which magnesium chloride is most preferred.

The compound of the formula $Me(OR)_nX_{z-n}$ includes NaOR, $Mg(OR)_2$, $Mg(OR)X$, $Ca(OR)_2$, $Zn(OR)_2$, $Zn(OR)X$, $Cd(OR)_2$, $B(OR)_3$, $B(OR)_2X$, $Ga(OR)_3$, $Ge(OR)_4$, $Sn(OR)_4$, $P(OR)_3$, $Cr(OR)_2$, $Mn(OR)_2$, $Fe(OR)_2$, $Fe(OR)_3$, $Co(OR)_2$ and $Ni(OR)_2$ more specific examples are $NaOC_2H_5$, $NaOC_4H_9$, $Mg(OCH_3)_2$, $Mg(OC_2H_5)_2$, $Mg(OC_6H_5)_2$, $Ca(OC_2H_5)_2$, $Zn(OC_2H_5)_2$, $Zn(OC_2H_5)Cl$, $B(OC_2H_5)_3$, $B(OC_2H_5)_2Cl$, $P(OC_2H_5)_3$, $P(OC_6H_5)_3$ and $Fe(OC_4H_9)_3$. Most preferred are compounds represented by $Mg(OR)_nX_{2-n}$ and $B(OR)_nX_{3-n}$ where R is most preferably an alkyl group of 1–4 carbon atoms or phenyl group.

The compound of the formula $Si(OR')_mX_{4-m}$ where R' is an alkyl, aryl or aralkyl group of 1–20 carbon atoms and m is $0 \leq m \leq 4$, preferably m is $0 < m \leq 4$, includes monomethoxytrichlorosilane, monoethoxytrichlorosilane, monoisopropoxytrichlorosilane, mono-n-butoxytrichlorosilane, monopentoxytrichlorosilane, monooctoxytrichlorosilane, monostearoxytrichlorosilane, monophenoxytrichlorosilane, mono-p-methylphenoxytrichlorosilane, dimethoxydichlorosilane, diethoxydichlorosilane, diisopropoxydichlorosilane, di-n-butoxydichlorosilane, dioctoxydichlorosilane, trimethoxymonochlorosilane, triethoxymonochlorosilane, triisopropoxymonochlorosilane, tri-n-butoxymonochlorosilane, tri-sec-butoxymonochlorosilane, tetraethoxysilane, tetraisopropoxysilane and silicon tetrachloride.

The titanium and/or vanadium compound includes halides, alkoxyhalides, alkoxides and halogen oxides of titanium and/or vanadium. Trivalent and tetravalent titanium compounds are preferred as the titanium compound used in accordance with the invention.

The tetravalent titanium compound may be represented by the formula $Ti(OR)_nX_{4-n}$ (where R is an alkyl, aryl or aralkyl group of 1–20 carbon atoms, X is a halogen atom, and n is $0 \leq n \leq 4$, preferably n is $0 < n \leq 4$.), typical examples of which include titanium tetrachloride, titanium tetrabromide, titanium tetraiodide, monomethoxytrichlorotitanium, dimethoxydichlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium.

Typical examples of such trivalent titanium compound are a titanium trihalide resulting from reducing titanium tetrahalide such as titanium tetrachloride with hydrogen, aluminum, titanium or an organometal compound of a metal of Groups I–III of the Periodic Table, and a trivalent titanium compound resulting from reducing a titanium alkoxyhalide of the formula $Ti(OR)_mX_{4-m}$ (where R is an alkyl, aryl or aralkyl group of 1–20 carbon atoms, X is a halogen atom and m is $0 < m < 4$.) with an organometal compound of a metal of Groups I–III of the Periodic Table.

Tetravalent titanium compounds are most preferred in the invention.

The vanadium compound includes a trivalent vanadium compound such as vanadium trichloride and vanadium triethoxide, a tetravalent vanadium compound such as vanadium tetrachloride, vanadium tetrabromide, vanadium tetraiodide, and tetraethoxyvanadium, and a pentavalent vanadium compound such as oxytrichlorovanadium, ethoxydichlorovanadyl, triethoxyvanadyl and tributoxyvanadyl.

To obtain a more effective result according to the invention, both titanium and vanadium compounds may be used in combination, in which instance the mole ratio of vanadium/titanium is preferably in the range of 2/1–0.01/1.

There is no particular limitation imposed upon the method of reacting magnesium halide (a), $Me(OR)_nX_{z-n}$ compound (b), $Si(OR')_mX_{4-m}$ compound (c), and titanium and/or vanadium compound (d). This reaction may be carried out in the presence or absence of inert solvents at a temperature ranging from 20° to 400° C., preferably from 50° to 300° C., usually for 5 minutes to 20 hours. The reaction can be done by way of copulverization under the same conditions. Alternatively, the solution reaction may be combined at will with the copulverization process.

The sequence in which the components (a)–(d) are reacted is not restricted. All of these four components may be reacted simultaneously, or three of them may be reacted first and then with the remaining component, or two of them reacted first and then with the remaining two, or two of them reacted first, next with one of them and then with the remaining one.

Proposed below are some of the preferred methods of more effectively carrying out the reaction.

1. The components (a), (b), (c) and (d) are copulverized in any convenient order or sequence of addition. In this instance, however, care must be taken so that components (c) and (d) may not undergo reaction with each other in advance to the other remaining components. For instance, components (a), (b) and (c) may be copulverized, followed by addition of component (d), and then this reaction is continued. Alternatively, component (a), (b) and (d) may be copulverized, followed by addition of component (c), and then the reaction is continued.

2. Two or three of the components (a), (b), (c) and (d) are reacted at 20°–400° C. in the presence or absence of solvents. This reaction product is then added with the remaining component or components and subjected to copulverization. In this instance, care must be taken so that components (c) and (d) may not have reacted with each other in advance.

3. Two or three of the components (a), (b), (c) and (d) are copulverized, followed by reaction with the remaining component or components at 20°–400° C. in the presence or absence of solvents. In this instance, care must be taken so that components (c) and (d), may not have reacted with each other in advance.

Inert solvents if desired to be used may be such hydrocarbon compounds and/or their derivatives which do not deactivate Ziegler catalysts. Typical examples of such compounds are propane, butane, pentane, hexane, heptane, octane, benzene, toluene, xylene, cyclohexane, ethanol, diethyl ether, tetrahydrofuran, ethyl acetate and ethyl benzoate.

It has now been found that the mol ratio of magnesium halide to compound of the formula $Me(OR)_nX_{z-n}$ in terms of Mg/Me is in the range of 1/0.001–1/20, preferably 1/0.01–1/1, most preferably 1/0.05–1/0.5. Amounts of the latter compound (b) departing from these ranges would result in reduced polymerization activity.

The compound (c) of the formula $Si(OR')_mX_{4-m}$ should be used in amounts of 0.1–50 grams, per 100 grams of the magnesium halide (a).

The titanium and/or vanadium compound should be used in such an amount that the resulting solid catalyst component contains 0.5–20, or preferably 1–10 percent by weight of titanium and/or vanadium so as to obtain a well balanced activity per titanium and/or vanadium and per solid catalyst.

The organometal compound contemplated by the present invention may be those of metals belonging to the Group I to IV metals in the Periodic Table which are known as one component of the Ziegler catalyst and preferably includes organoaluminum compounds and organozinc compounds. Examples of these organometal compounds are organoaluminum compounds represented by the general formula $R_3Al$, $R_2AlX$, $RAlX_2$, $R_2AlOR$, $RAl(OR)X$, and $R_3Al_2X_3$ (where R is an alkyl group or aryl group of 1 to 20 carbon atoms, which may be the same or different; and X is a halogen atom), and organozinc compounds represented by the general formula $R_2Z_n$ (where R is an alkyl group of 1 to 20 carbon atoms, which may be either identical or different). Typical examples of these compounds include triethylaluminum, triisobutylaluminum, trihexylaluminum, trioctylaluminum, diethylaluminumchloride, ethylaluminumsesquichloride, diethylzinc and mixtures thereof. These compounds may be used together with organic carboxylic acid esters such as ethylbenzoate, ethyl o or p-toluylate and ethyl p-anisate. The organometal compounds may usually be used in amounts of from 0.1 to 1,000 mols with respect to the transition metal compound.

The solid catalyst component according to the invention may be used after it has been reacted with halogen-containing aluminum compounds of the formula $R_2AlX$, $RAlX_2$, $RAl(OR)X$ or $R_3Al_2X_3$, in which instance the mol ratio of these aluminum compounds to the titanium and/or vanadium compound should be 1:0.01–100, preferably 1:0.3–50. The reaction may be effected for example in the presence of inert hydrocarbons or by copulverization in the absence of any solvent at 0°–100° C. for 5 minutes to 10 hours. The resulting solid catalyst component exhibits improved catalystic activity and contributes to narrowed molecular weight distribution of the product polymer. The organometallic compound to be combined with the catalyst component is most preferably an organoaluminum compound of the formula $R_3Al$ amongst the above examples.

The polymerization of olefins according to the invention is carried out in very much the same way as it is done in the presence of Ziegler catalysts where the reaction takes place in a slurried, solution or gas-phase condition in the presence or absence of an inert hydrocarbon atmosphere substantially free of oxygen and water. The gas-phase polymerization is particularly preferred. It is carried out at a temperature of 20° to 120° C., preferably 50° to 100° C. and at a pressure of atmospheric to 70 kg/cm², preferably 2 to 60 kg/cm². Molecular weights of the resulting polymer may be regulated to some extent by varying the polymerization temperature as well as the quantities of catalysts but can be more effectively requlated by the addition of hydrogen in the polymerization system. It is possible to effect the polymerization reaction in two or more multi-stages involving different hydrogen concentrations, temperatures and other polymerization conditions.

The process of the invention may be applied to all olefins polymerizable with use of Ziegler catalysts and more specifically to the homopolymerization of alpha-olefins of 2–12 carbon atoms such as ethylene, propylene, 1-butene, hexane-1, 4-methylpentene-1, and octane-1, and also to the copolymerization of ethylene and propylene, ethylene and 1-butene, ethylene and hexene-1, ethylene and 4-methylpentene-1, ethylene and octene-1, and propylene and 1-butene, as well as ethylene and two or more of α-olefins with satisfactory results.

With a view to improving the quality of polyolefins, the invention may be applied to copolymerization of dienes such as butadiene, 1,4-hexadiene, ethylidenenorbornene, and dicyclopentadiene.

The following examples are provided for a better understanding of the invention but are not intended to impose limitations on the invention.

INVENTIVE EXAMPLE 1

Preparation of Solid Catalyst Component

A stainless steel pot of 400 ml containing 25 stainless steel balls of a half-inch diameter was charged with 10 grams of commercially available anhydrous magnesium chloride, 2.3 grams of boron triethoxide and 2.5 grams of titanium tetrachloride. The admixture was subjected to ball milling for 16 hours at room temperature in a nitrogen atmosphere. Milling was continued for another 16 hours, followed by addition of 2.5 grams of tetraethoxysilane, thereby obtaining a white pulverized product. There was 36 mg. of titanium per gram solid catalyst component.

Polymerization

A stainless steel autoclave was used for gas-phase polymerization. A loop was formed with a blower, a flow controller and a dry cyclone. Temperature of the autoclave was adjusted with a flow of warm water through its jacket. The autoclave adjusted in its temperature at 80° C. was charged with the solid catalyst component at a rate of 50 mg./hr. and triethylaluminum at a rate of 5 m mol/hr. Butene-1/ethylene was added at controlled molar ratio of 0.27 and hydrogen was also supplied at controlled rate of 15% of the total pressure. Polymerization was effected at a total pressure held at 10 kg/cm²·G with the gases in the system circulated by the blower. The resulting ethylene copolymer had a bulk density of 0.39, a melt index of 1.2 and a density of 0.9208. Catalytic activity was as high as 468,000 grams of copolymer per gram titanium.

After 10 hours of continuous run, the autoclave was opened for inspection whereupon there was no polymer deposit either on its inner wall or the agitator. The copolymer showed F.R. value of 7.0 which represents the ratio of a sample having a melt index of 2.16 measured with a load of 2.16 kg. at 190° C. to a sample having a melt index of 10 measured with a load of 10 kg. according to ASTM-D1238-65T. Its molecular weight distribution was very narrow.

A film of the copolymer was extracted in boiling hexane over 10 hours to show a hexane extract as small as 1.1 wt. %.

COMPARATIVE EXAMPLE 1

The procedure of Inventive Example 1 was followed in preparing a solid catalyst component except that no tetraethoxysilane was added. There was 45 mg. of titanium per gram of solid catalyst component. Continuous gas-phase polymerization was effected in the manner described in Inventive Example 1 except that the solid catalyst component was fed at a rate of 50 mg./hr. The resulting ethylene copolymer had a bulk density of 0.34, a density of 0.9201 and a melt index of 2.1. Catalytic activity was represented by 315,000 grams of copolymer per gram titanium.

After 10 hours of continuous run, the autoclave was opened for inspection whereupon there was found some polymer deposit on its inner wall as well as on the agitator. The copolymer showed F.R. value of 8.3. A film of the copolymer was extracted in boiling hexane over 10 hours to show a hexane extract of 4.0 wt. %.

INVENTIVE EXAMPLE 2

A three-necked flask equipped with a magnetic induction type agitator was charged with 100 ml of ethanol, 20 grams of anhydrous magnesium choride, 4.5 grams of triethoxyboron, and 5 grams of tetraethoxysilane. Reaction was continued under reflux for 3 hours. Upon completion of reaction, 150 ml of n-hexane was added, the supernatant was removed, and vacuum drying was effected at 200° C. thereby producing a white dry powder. 12 grams of this powder and 2.3 grams of titanium tetrachloride were taken into a stainless steel pot of the type described in Inventive Example 1 and subjected to ball milling for 16 hours at room temperature in a nitrogen atmosphere. As a result, there was obtained a solid catalyst component containing 40 mg. of titanium per gram of solid powder.

Continuous gas-phase polymerization was effected in the manner described in Inventive Example 1 except that the solid catalyst component was fed at a rate of 50 mg./hr. The resulting ethylene copolymer had a bulk density of 0.36, a melt index of 0.9 and a density of 0.9211. Catalytic activity was as high as 445,000 grams of copolymer per gram titanium.

After 10 hours of continuous run, the autoclave was opened for inspection whereupon there was no polymer deposit either on its inner wall or the agitator. The copolymer showed F.R. value of 7.3.

A film of the copolymer was extracted in boiling hexane over 10 hours to show a hexane extract as small as 1.3 wt. %.

INVENTIVE EXAMPLE 3

The ball mill pot described in Inventive Example 1 was charged with 10 grams of anhydrous magnesium chloride, 3.1 grams of diethoxymagnesium, 2.1 grams of triethoxymonochlorosilane and 2.5 grams of titanium tetrachloride. This admixture was subjected to ball milling at room temperature in a nitrogen atmosphere for 16 hours, thereby obtaining a white particulate solid containing 34 mg. of titanium per gram solid.

Continuous gas-phase polymerization was effected in the manner described in Inventive Example 1 except that the solid catalyst component was fed at a rate of 50 mg./hr. The resulting ethylene copolymer had a bulk density of 0.39, a melt index of 1.1 and a density of 0.9198. Catalytic activity was as high as 573,000 grams of copolymer per gram titanium.

After 10 hours of continuous run, the autoclave was opened for inspection whereupon there was no polymer deposit either on its inner wall or the agitator. The copolymer showed F.R. value of 7.1. A film of the copolymer was extracted in boiling hexane over 10 hours to show a hexane extract as small as 1.3 wt. %.

INVENTIVE EXAMPLE 4

The ball mill pot described in Inventive Example 1 was charged with 10 grams of anhydrous magnesium chloride, 2.1 grams of triethoxyphosphate (P(OEt)$_3$) and 2.5 grams of titanium tetrachloride. This admixture was subjected to ball milling at room temperature in a nitrogen atmosphere for 16 hours, followed by addition of 2.5 grams of tetraethoxysilane. Milling was continued for another 5 hours. The resulting solid catalyst component contained 37 mg. of titanium per gram solid. Continuous gas-phase polymerization was conducted in the manner described in Inventive Example 1 except that the solid catalyst component was fed at a rate of 50 mg./hr. The resulting ethylene copolymer had a bulk density of 0.37, a melt index of 0.81 and a density of 0.9208. Catalytic activity was as high as 418,000 grams of copolymer per gram titanium.

After 10 hours of continuous run, the autoclave was opened for inspection whereupon there was no polymer deposit either on its inner wall or the agitator. The copolymer showed F.R. value of 7.4 and a very narrow molecular weight distribution.

A film of the copolymer was extracted in boiling hexane over 10 hours to show a hexane extract as small as 1.1 wt. %.

INVENTIVE EXAMPLE 5

The ball mill pot of the type described in Inventive Example 1 was charged with 10 grams of anhydrous magnesium chloride, 3.5 grams of diethoxyzinc, and 2.8 grams of diisopropoxy dichlorotitanium. The admixture was subjected to ball milling for 16 hours in a nitrogen atmsphere at room temperature. Additional 5 hours of milling was continued after addition of 2.1 grams of dichlorodiethoxysilane. The procedure of Inventive Example 1 was followed for continuous gas-phase polymerization except that the solid catalyst component was fed at a rate of 50 mg./hr. The resulting ethylene copolymer had a bulk density of 0.36, a melt index of 1.6 and a density of 0.9221. Catalytic activity was represented by 347,000 grams of copolymer per gram titanium.

After 10 hours of continuous run, the autoclave was opened for inspection whereupon there was found no polymer deposit either on its inner wall or on the agitator. The copolymer showed F.R. value of 7.2. A film of the copolymer was extracted in boiling hexane over 10 hours to show a hexane extract of 1.6 wt. %.

INVENTIVE EXAMPLE 6

A stainless steel autoclave of 2-liter capacity with an induction agitator was purged with nitrogen and then charged with 1,000 milliliters of hexane. 1 milli-mol of triethylaluminum and 10 milligrams of the solid catalyst component obtained in Inventive Example 1 were added. While the batch was being agitated, the temperature was elevated to 90° C. Under the vapor pressure of hexane, the reaction system showed a pressure of 2 kg/cm$^2$·G. The system was charged with hydrogen to a total pressure of 4.8 kg/cm$^2$·G, and subsequently ethylene was charged to a total pressure of 10 kg/cm$^2$·G, whereupon the polymerization was initiated. The polymerization was continued for 1 hour with continuous charge of ethylene to maintain a total pressure of 10 kg/cm$^2$·G. After termination of the polymerization, the polymeric slurry was decanted into a beaker, and hexane was removed in vacuum, whereby there was obtained 211 grams white polyethylene having a melt index of 1.2, a bulk density of 0.35 and a density of 0.9628. Catalytic activity was represented by 112,700 grams of polyethylene per gram titanium per hour per ethylene pressure, or 4,060 grams of polyethylene per gram solid per hour per ethylene pressure.

The resulting polyethylene showed F.R. value of 8.3 and a molecular weight distribution much narrower than that of the product obtained in Comparative Example 2 below. Hexane extract was 0.18 wt. %.

COMPARATIVE EXAMPLE 2

The procedure of Inventive Example 6 was followed in polymerizing 10 mg. of solid catalyst component of Comparative Example 1 over 1 hour. 145 grams of white polyethylene was obtained, which showed a melt index of 1.7, a density of 0.9635 and a bulk density of 0.30. Catalytic activity was represented by 61,970 grams polyethylene per titanium per hr. per ethylene pressure or 2,790 grams polyethylene per gram solid per hr. per ethylene pressure.

The resulting polyethylene showed F.R. value of 9.3 and hexane extract of 1.2 wt. %.

What is claimed is:

1. A process for production of polyolefins which comprises homopolymerization or copolymerization of α-olefins at a temperature of 20° to 120° C. and a pressure of atmosphere to 70 kg./cm.$^2$ in the presence of a catalyst comprising a solid catalyst component and an organoaluminum compound, said solid catalyst component being obtained by the reaction of: (a) a magnesium dihalide, (b) a compound of the formula Me(OR)$_n$X$_{z-n}$ where Me is, an element selected from Mg, B, P and Zn, R is a hydrocarbon residual group having 1–24 carbon atoms, X is a halogen atom, z represents the valence of Me and n is 1 to z and where the mol ratio of said magnesium dihalide (a) to said compound (b) in terms of Mg/Me is in the range of 1/0.05–1/0.5 and (c) a compound of the formula $Si(OR')_m X_{4-m}$ in an amount of 0.1–50 grams per 100 grams of said magnesium dihalide (a), where R' is a hydrocarbon residual group having 1–20 carbon atoms, X is a halogen atom, and m is 1 to 4, and (d) a titanium compound and/or a vanadium compound.

2. The process for the production of polyolefins as claimed in claim 1, wherein the polymerization of α-olefins is effected in gas-phase.

3. The process for the production of polyolefins as claimed in claim 1 wherein said compound of formula $Me(OR)_n X_{z-n}$ is $Mg(OR)_n X_{2-n}$ or $B(OR)_n X_{3-n}$, wherein R is an alkyl group of 1–4 carbon atoms or a phenyl group and X is a halogen atom and n is as already defined.

4. The process for the production of polyolefins as claimed in claim 1 wherein said component (d) comprises a combination of vanadium and titanium in a mole ratio of vanadium/titanium of about 2/1 to 0.01/1.

5. The process for the production of polyolefins as claimed in claim 1 wherein component (d) is a tetravalent titanium compound of the formula $Ti(OR)_n X_{4-n}$, wherein R is an alkyl, aryl or aralkyl group of 1 to 20 carbon atoms, X is a halogen atom and n is $0 \leq n \leq 4$.

6. The process for the production of polyolefins as claimed in claim 1 wherein said solid catalyst component is obtained by copulverizing at least two of the components (a), (b), (c) and (d) and then reacting any remaining component with the copulverizing product at a temperature of 20° to 400° C., with the proviso that components (c) and (d) do not undergo reaction with each other in advance of the other components.

7. The process for the production of polyolefins as claimed in claim 1 wherein said solid product is obtained by reacting two or three of said components (a), (b), (c), and (d) at a temperature of 20° to 400° C. and then copulverizing the remaining component or components with the product of the reaction, with the proviso that components (c) and (d) do not undergo reaction with each other in advance of the remaining components.

8. The process for the production of polyolefins as claimed in claim 1 in which an α-olefin of 2–12 carbon atoms is homopolymerized, ethylene is copolymerized with an α-olefin containing 3 to 8 carbon atoms, or propylene is copolymerized with 1-butene.

9. The process for the production of polyolefins as claimed in claim 1 in which said magnesium halide is magnesium chloride.

10. The process for the production of polyolefins as claimed in claim 1 in which said magnesium halide is magnesium chloride, and component (d) is a tetravalent titanium compound.

* * * * *

UNITED STATES PATENT AND TRADEMARK OFFICE
CERTIFICATE OF CORRECTION

PATENT NO. : 4,518,752

DATED : May 21, 1985

INVENTOR(S) : KURODA ET AL.

It is certified that error appears in the above-identified patent and that said Letters Patent is hereby corrected as shown below:

In Column 1 of the Title Page, Item [75]

in the Section headed "Inventors:", line 4, kindly insert after "Matsuura,

Tokyo" --;Mitsuji Miyoshi, Fujisawa--.

Signed and Sealed this

Eleventh Day of February 1986

[SEAL]

Attest:

DONALD J. QUIGG

Attesting Officer

Commissioner of Patents and Trademarks